United States Patent Office 3,014,714
Patented Dec. 26, 1961

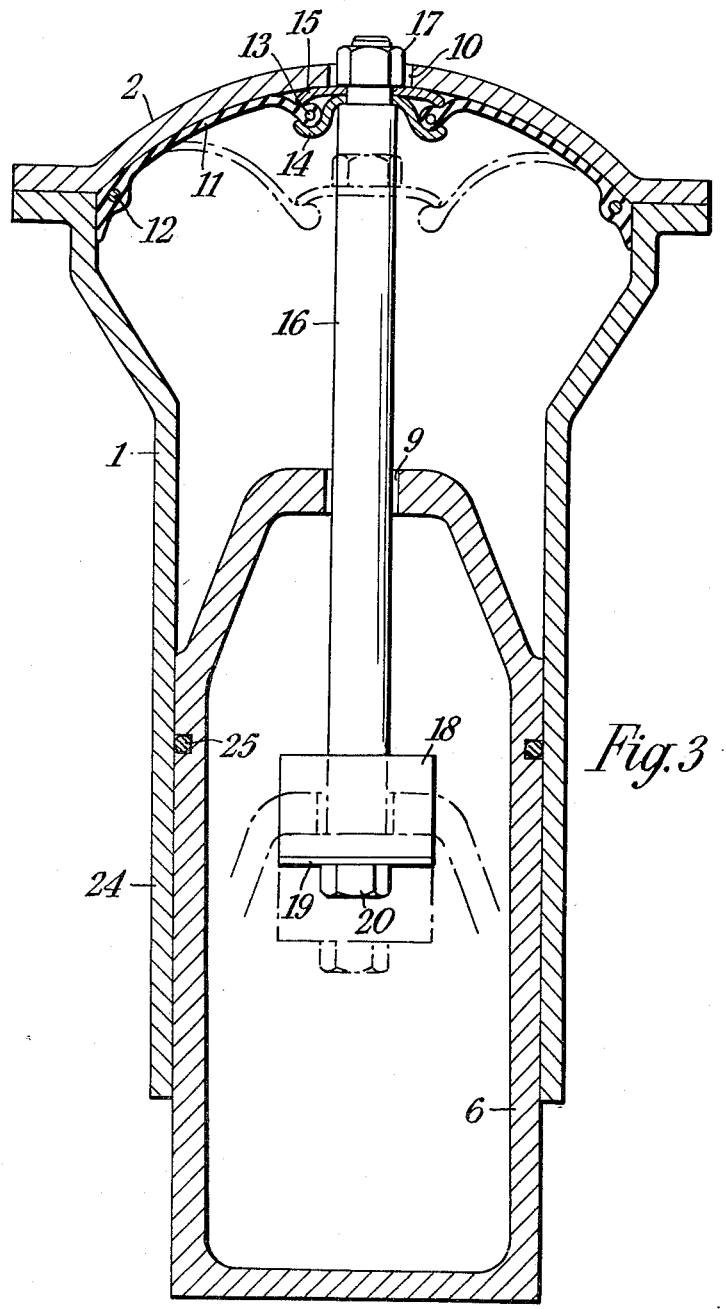

3,014,714
FLUID-PRESSURE SPRINGS
Henry William Trevaskis, Point Pleasant, Blackdown, near Leamington Spa, England, assignor to Dunlop Rubber Company Limited, London County, England, a British company
Filed Apr. 28, 1959, Ser. No. 809,384
Claims priority, application Great Britain May 3, 1958
10 Claims. (Cl. 267—65)

This invention relates to fluid-pressure springs, particularly but not exclusively air springs.

One of the advantages of some air springs is that the load/deflection curve may be arranged to give an increasing rate on bump and rebound. This is generally accepted as a desirable feature when using the very low frequency suspension which air springs make possible.

However, the normal methods of arranging the load/deflection curve, for example, in diaphragm type springs, by suitably shaping the head of the plunger and the adjacent walls of the container, put undesirable stresses on the spring components. The object of the present invention is to largely overcome this undesirable feature on the rebound stroke, which is the more difficult to control.

Another object of the invention is to so arrange the rebound characteristics of the spring that separation of the two parts of the spring beyond a predetermined distance is prevented, without the necessity of providing check straps or the like.

According to the invention a fluid-pressure spring comprises a container having two relatively movable end portions and a flexible end wall normally abutting one of said end portions and means connecting said flexible end wall with the other of said end portions whereby on extension of said spring beyond a predetermined distance the flexible end wall is drawn progressively away from said end portion to prevent the pressure in said spring from falling below a predetermined value.

The invention is particularly useful in vehicle suspension systems, and the spring may comprise a diaphragm, a convoluted bellows or a telescopic piston and cylinder. The flexible end wall is normally a flexible annulus of reinforced rubber or rubber-like material which is fluid-tightly secured across the container adjacent the upper of the two relatively-movable end portions and normally abuts said end portion. The flexible annulus may be secured to one end of a rod the other end of which is associated with the other of said relatively movable end portions, the arrangement being such that as the said portions move away from one another, through more than a predetermined distance, the rod progressively draws the annulus away from the said upper portion. The effective area of the annulus may be varied by the movement, and when this occurs, movement may continue until the effective areas of spring and annulus are equal, when the spring is balanced. In the case of a vehicle suspension, balance implies that no downward thrust is imparted to the vehicle suspension. When balance occurs, with a diaphragm-type spring, the load carried by the spring is distributed equally between the diaphragm and the annulus.

The invention further consists in a fluid pressure spring having a container which comprises a cylindrical side-wall, a rigid closure secured thereto or integral therewith, a flexible end wall secured to said side wall and normally lying adjacent to said closure, a plunger having a head to which the inner periphery of a flexible diaphragm is secured, the outer periphery of said diaphragm being secured to the said side-wall, the diaphragm having a lobe which lies between said head and a guide secured to the side-wall, the plunger being hollow and accommodating a buffer stop secured to one end of a rod, and the rod extending through a passage in the plunger and being fixed to said flexible end wall, so that upon extension of the spring the flexible end wall remains stationary while the plunger moves relatively to the closure and the rod until the buffer stop contacts the inside of the plunger head, and further movement of the plunger relatively to the closure moves the flexible end wall relative thereto.

The invention also consists in a fluid pressure spring comprising a convoluted flexible bellows, a rigid closure and a rigid end wall secured to respective ends of the bellows, a flexible end wall secured to said closure and normally lying adjacent thereto, a rod fixed to said flexible wall and extending through the rigid end wall, and a buffer stop secured to the end of the rod outside the bellows and normally spaced therefrom, so that upon extension of the spring the flexible end wall remains stationary while the said rigid end-wall moves relatively to the rod until it contacts the buffer stop, further movement causing the flexible end wall to move relative to the adjacent closure.

In addition, the invention consists in a fluid pressure spring comprising a container having a cylindrical extension in which a hollow plunger is fluid-tightly slidable and a rigid closure, a flexible end wall secured to and normally lying adjacent said closure, a buffer stop accommodated in the plunger, and a rod secured to said buffer, extending through the plunger wall and fixed to the flexible wall, so that the latter may move in the same direction as the plunger and away from the closure after initial movement in that direction has taken up a clearance between the plunger wall and the buffer stop.

In order that the invention may be better understood and carried into practice, reference will now be made to the accompanying drawings, wherein:

FIGURE 3 is a sectional elevation of a telescopic piston and cylinder spring.

Figure 1:
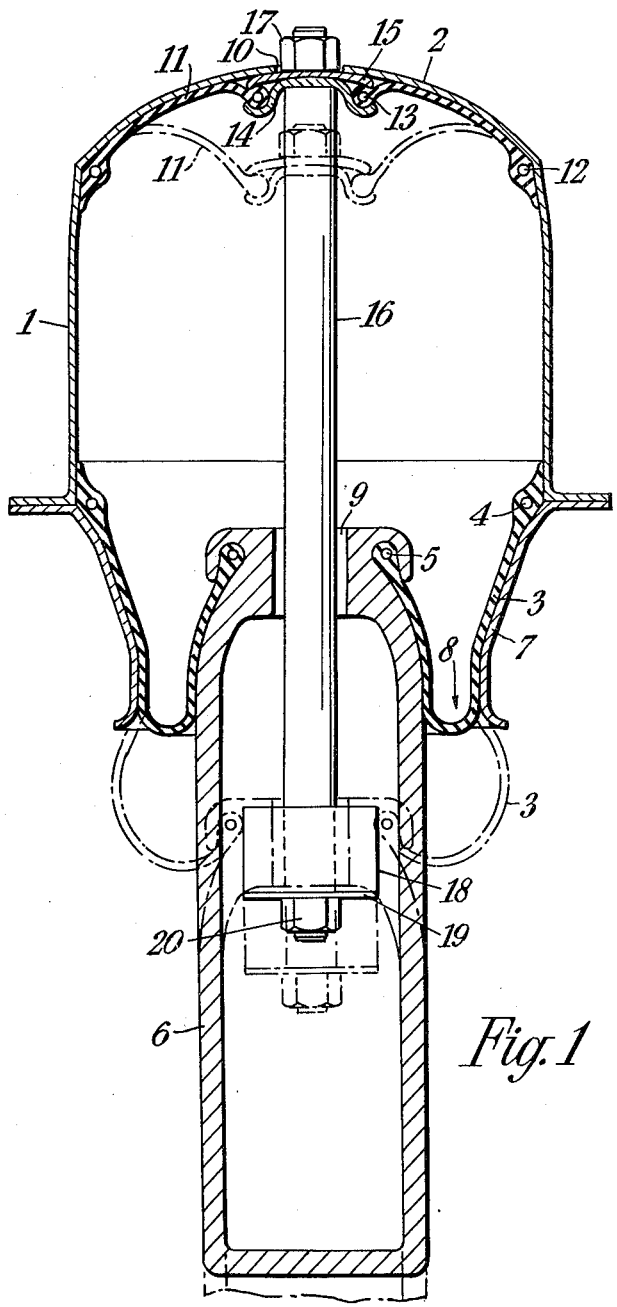
FIGURE 1 is a sectional elevation of a rolling-lobe diaphragm spring.

The spring shown in FIGURE 1 comprises a fluid-tight container which includes a substantially cylindrical side-wall 1, a domed rigid closure 2 secured to or integral with the side-wall and a flexible annular diaphragm 3 which is located at the opposite end of the side-wall to the closure. The outer periphery of the diaphragm has a bead reinforcement 4 and is secured to the lip of the side-wall, and the inner periphery of the diaphragm also has a bead reinforcement 5, and is secured to the head of a generally cylindrical plunger 6 which is disposed co-axially of the spring.

A frusto-conical guide 7 is secured to the said lip of the side-wall and extends away from the closure, the diaphragm following the contour of the guide and of the plunger head to form a lobe 8 therebetween.

The plunger is hollow and has a passage 9 extending co-axially through its head, and an aligned hole 10 extends through the closure.

A flexible annular end wall 11 having an outer peripheral bead reinforcement 12 secured to the side-wall at the end adjacent the closure is located in the container: the inner periphery of the end-wall is also provided with a reinforcement 13 and is fluid-tightly trapped between a flanged plate 14 and a retainer 15 which are fixed in abutment with a shoulder near the end of a rod 16 by a nut 17. The rod extends axially of the spring through the passage 9 and into the hollow plunger, and a resilient buffer-stop 18 is secured to the free end of the rod by a plate 19 and nut 20. The buffer is larger in diameter than the passage 9.

The buffer stop is a clearance fit in the plunger 6 as is the rod in the passage 9 and the nut 17 in the hole 10.

In the drawing, the spring is shown with parts in full line in the neutral or intermediate position, i.e. when the spring is substantially midway between its fully extended or rebound and its fully deflected or bump positions. In this neutral position, the flexible end wall abuts the closure and is supported thereby.

The spring normally operates in the conventional manner, the flexible end wall being pressed against the domed end of the container by the pressure of the air therein and playing no part in the operation of the spring. Under rebound conditions, however, when the plunger, moving downwardly away from the container, first abuts the buffer stop and then carries it and the rod in the same direction, the upper end of the rod draws the flexible end wall progressively away from the domed end of the container and against the pressure therein. This pressure, acting upwardly on the unsupported area of flexible end wall drawn away from the domed end of the container, tends to progressively check further downward movement of the plunger relative to the container. Such movement may continue, however, under extreme conditions, until the effective area of unsupported flexible end wall drawn away from the container equals the effective area of the lower diaphragm.

Thus on the rebound stroke of the spring, beyond a predetermined free movement of the plunger, the flexible end wall takes a gradually increasing proportion of the load until, when the effective area of said end wall equals that of the lower diaphragm, said wall and said diaphragm each take exactly half the total load. After this the flexible end wall takes the greater proportion of the load.

With such a construction also, check straps and the like, to limit separation of the two parts of the spring, are rendered unnecessary.

Figure 2:
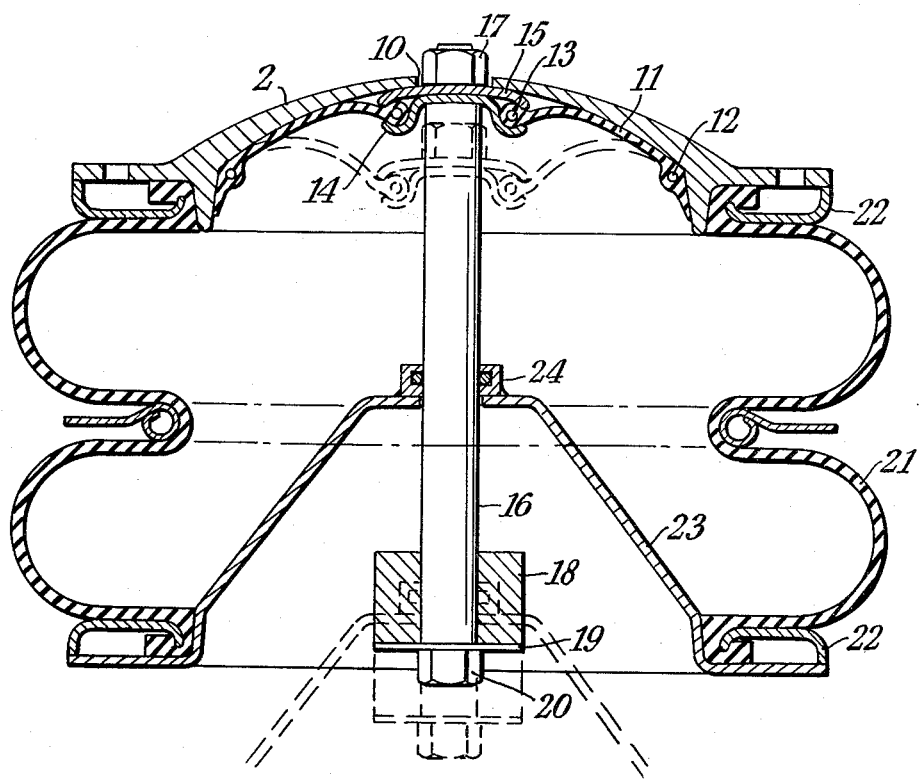
FIGURE 2 is a sectional elevation of a bellows spring.

The springs shown in FIGURES 2 and 3, are generally similar to that shown in FIGURE 1, and parts corresponding to those of the spring of FIGURE 1 having been designated by like reference numerals.

The spring shown in FIGURE 2 differs from that shown in FIGURE 1 in comprising a flexible double-convolution bellows 21 secured at one end to the domed rigid closure 10 by a pressure plate 22, and at the other end to a frusto-conical rigid end wall 23 by a further pressure plate.

The rod 16 extends through the wall 23 and leakage of fluid through the wall about the rod is prevented by a seal 24 carried on said wall.

Like the diaphragm spring of FIGURE 1, the bellows spring of FIGURE 2 may be extended on the rebound stroke without movement of the flexible end wall 11, until the wall 23 contacts the buffer stop 18. Further movement deflects the wall 11 so that increase in volume of the spring upon further extension ceases or continues at a reduced rate.

In the spring shown in FIGURE 3, the plunger 6 is a sliding fit in an extension 24 of the side-wall 1, and a seal 25 is provided between the plunger and side-wall.

In operation, the telescopic piston and cylinder spring of FIGURE 3 is generally similar to the other spring previously described.

In each of the embodiments hereinabove described the deflection of the flexible end wall has two effects on the rebound stroke of the spring. Firstly it causes the volume/deflection ratio to vary and hence flattens the load/deflection curve beyond the point at which the flexible end wall begins to deflect and secondly it varies the effective area of said end wall. In the case of the rolling-lobe diaphragm spring deflection also varies the effective area of the diaphragm so that it is possible to design a spring in accordance with the invention in which variation of the effective areas provides desirable spring characteristics.

Having now described my invention, what I claim is:

1. A fluid pressure spring having a container which comprises a cylindrical side wall and a rigid closure and a guide secured to the end of said side wall opposite said closure, a flexible end wall secured to said side wall and normally lying adjacent to said closure, a hollow plunger having a head, a flexible annular diaphragm secured at its inner periphery to said head, the outer periphery of said diaphragm being secured to the said side wall, the diaphragm having a lobe which lies between said head and said guide, a rod extending from said flexible end wall through the head of said plunger, a buffer stop on said rod within said plunger whereby upon extension of the spring the flexible end wall remains stationary while the plunger moves relatively to the closure and the rod until the buffer stop contacts the inside of the plunger head, and further movement of the plunger relatively to the closure moves the flexible end wall relative thereto.

2. A fluid pressure spring comprising a convoluted flexible bellows, a rigid closure and a rigid end wall secured to respective ends of the bellows, a flexible end wall secured to said closure and normally lying adjacent thereto, a rod fixed to said flexible wall and extending through the rigid end wall and a buffer stop secured to the end of the rod outside the bellows and normally spaced from said rigid end wall, so that upon extension of the spring the flexible end wall remains stationary while the said rigid end wall moves relatively to the rod until said rigid end wall contacts the buffer stop, further movement causing the flexible end wall to move relative to the adjacent closure.

3. A fluid pressure spring comprising a container for fluid under pressure having a fixed end wall and at the opposite end a wall movable toward and from said fixed end wall and comprising a stop having a passage therethrough, a flexible wall secured fluid-tightly at its periphery to said container in position to abut and be supported by the inner surface of said fixed end wall and a rod secured to said flexible wall within its periphery and extending through the passage of said stop, the part of said rod projecting through said passage having an enlargement spaced from said stop in normal position of said flexible wall and to be engaged by said stop when said movable end wall moves away a distance beyond the distance of said enlargement from said stop to draw the portion of said flexible wall within its periphery progressively from its abutment on said fixed end wall.

4. The spring of claim 3 in which said flexible wall is annular and has a reinforcement at its inner and outer peripheries and in which said reinforced portion of said inner periphery is engaged between a pair of plates mounted on said rod.

5. The spring of claim 3 in which said fixed end wall is concave to the interior of said container.

6. The spring of claim 3 in which said movable end wall and stop comprise a hollow plunger sealed to side walls of said container and having an opening through which said rod projects.

7. The spring of claim 6 in which said container has a cylindrical side wall and in which said plunger is a cylindrical plunger movable fluid-tightly in said cylindrical side wall.

8. The spring of claim 6 in which said container comprises an annular rolling lobe diaphragm connecting said plunger to the side wall of said container.

9. The spring of claim 3 in which said container comprises a bellows wall connected at its ends to said end wall to form a fluid tight container and flexible to enable one end wall to move axially relative to the other.

10. A fluid pressure spring comprising a container having a cylindrical extension at one end and a rigid enclosure at the other end, a hollow plunger fluid-tightly reciprocable in said extension, a flexible end wall secured in said container and normally lying adjacent said closure, a buffer stop reciprocable in the plunger and a rod secured to said buffer, extending through the plunger wall and fixed to the flexible wall, said buffer stop being spaced from said plunger wall so that said buffer stop and rod and flexible stop will move in the same direction as the plunger and away from the closure after initial movement in that direction has taken up the space between the plunger wall and the buffer stop.

References Cited in the file of this patent

UNITED STATES PATENTS

| | | |
|---|---|---|
| 2,056,106 | Kuhn | Sept. 29, 1936 |
| 2,874,713 | Ochs et al. | Feb. 24, 1959 |
| 2,936,860 | Peras | May 17, 1960 |

FOREIGN PATENTS

| | | |
|---|---|---|
| 1,153,671 | France | Oct. 14, 1957 |
| 785,195 | Great Britain | Oct. 23, 1957 |